Aug. 5, 1969  J. A. EVANS  3,459,334
AUTOMOBILE WASH AND WAX ASSEMBLY
Filed Sept. 11, 1967  2 Sheets-Sheet 1
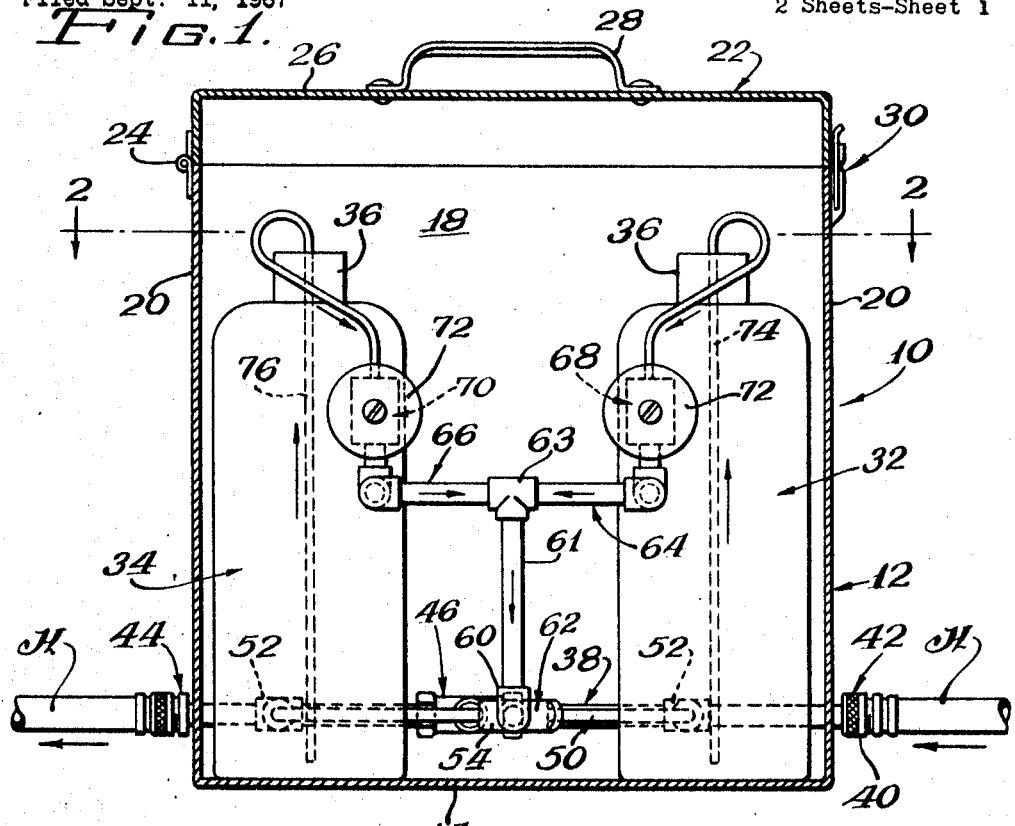
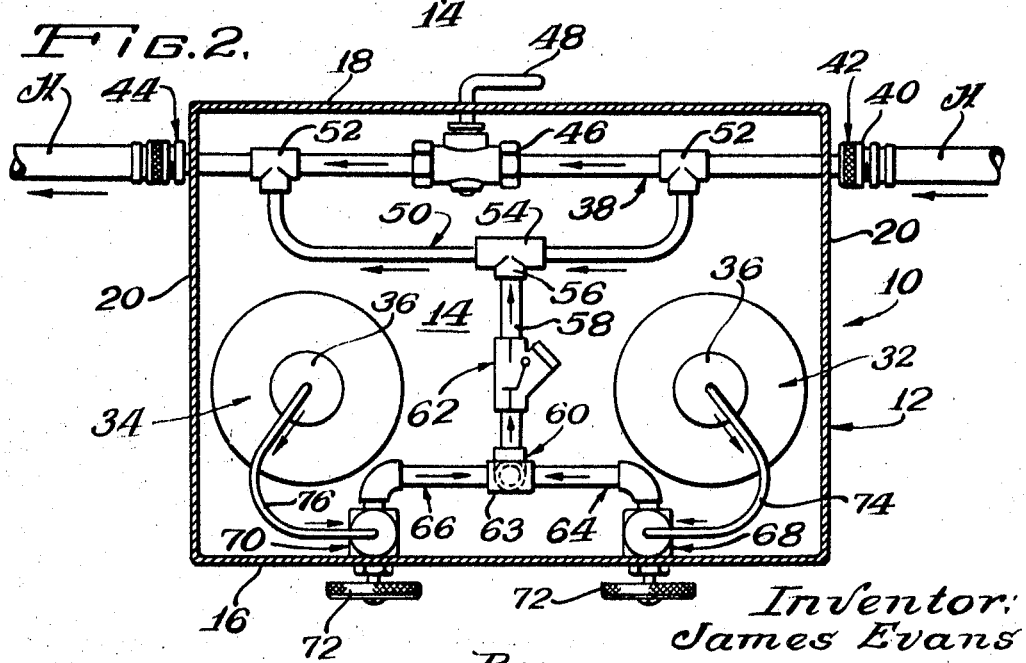
Inventor:
James Evans
By Bair, Freeman & Molinare
Attys.

Aug. 5, 1969    J. A. EVANS    3,459,334
AUTOMOBILE WASH AND WAX ASSEMBLY
Filed Sept. 11, 1967    2 Sheets-Sheet 2
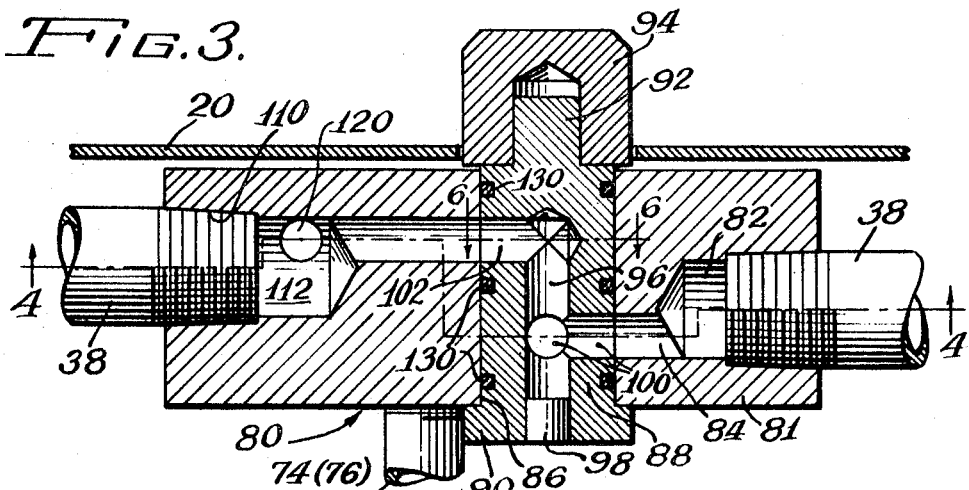
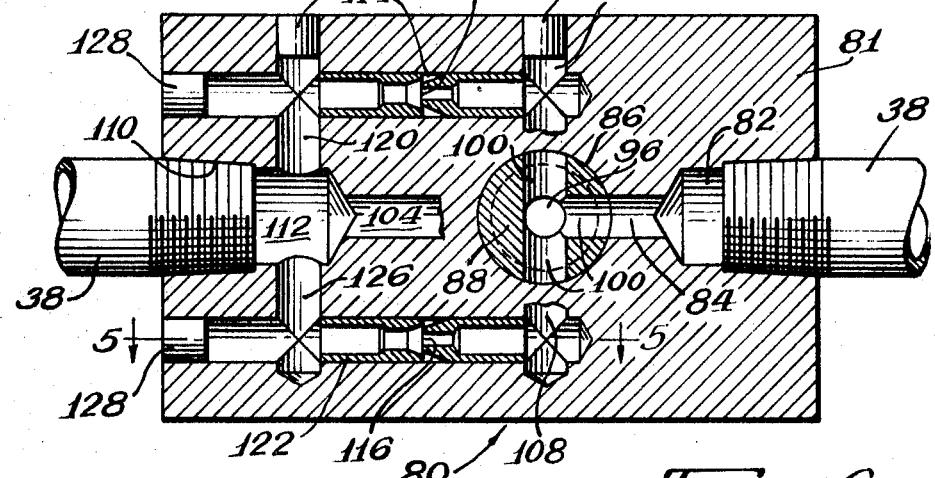
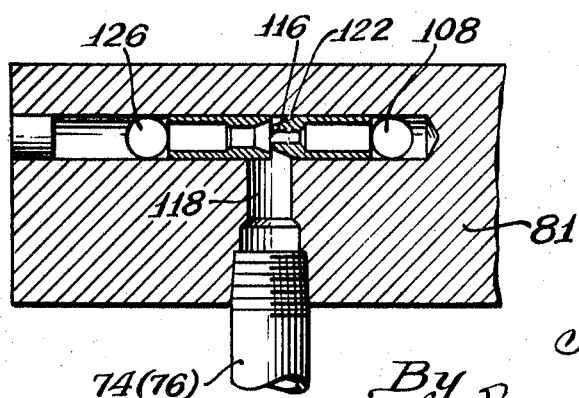
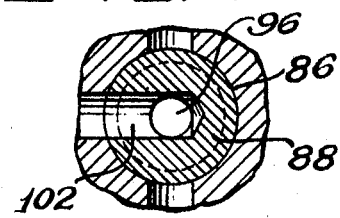
Inventor:
James Evans
By Bair, Freeman & Molinare
Attys.

United States Patent Office 3,459,334
Patented Aug. 5, 1969

3,459,334
AUTOMOBILE WASH AND WAX ASSEMBLY
James A. Evans, 13011 S. 71st Ave.,
Palos Heights, Ill. 60463
Filed Sept. 11, 1967, Ser. No. 666,573
Int. Cl. B67d 5/56
U.S. Cl. 222—132    7 Claims

ABSTRACT OF THE DISCLOSURE

A portable wash and wax apparatus used with automobiles. The apparatus has an enclosure which contains a liquid wax container and a cleaning liquid container. An inlet for the passage of pressurized water is provided and an outlet is provided for passage of water or a mixture of water and wax or a mixture of water and a cleaning liquid. Conduits interconnect the liquid wax container and the liquid cleaning container at a point between the inlet and the outlet. Venturi means are also provided between the inlet and the outlet and communicates with the liquid in the container for drawing liquid wax or the cleaning liquid from the respective container as a result of the action of pressurized water passing through the venturi. Valve means are provided for selectively permitting the passage of pressurized water only through the outlet, the passage of mixed water and cleaning liquid through the outlet, or the passage of mixed water and liquid wax through the outlet.

Background of the invention

*Field of the invention and description of the prior art.*—
This invention relates to a wash and wax apparatus particularly useful for cleaning and waxing automobiles.

A large amount of business is done today in the sale of materials, devices, and services for cleaning and waxing automobiles. There is a great variety of commercially available cleaning powders, soaps, liquids, detergents, and the like as well as various types of liquid and paste waxes. Neighborhood service stations and automated car wash establishments have a considerable amount of business in cleaning and waxing of automobiles.

Although the public makes considerable use of car wash services, because of the pride of ownership that many people have in their automobiles, these people would rather wash and wax their automobiles themselves. That many people would prefer to clean their own automobiles is shown by the relatively recent influx of self-service car wash establishments. Because of this desire of people to clean their own automobiles, it would be highly desirable to provide economical and simple equipment for washing and waxing automobiles which could be effectively operated simply by connection to an ordinary garden hose so a person would not have to drive away from home to clean and wax his automobile.

Summary of the invention

It is therefore an important object of this invention to provide a wash and wax unit useful by a car owner for rapidly and efficiently cleaning and waxing his automobile.

It is a further important object of this invention to provide a wash and wax unit for automobiles wherein the unit is portable and can be effectively operated simply by connection to an ordinary garden hose available at a person's house.

It is another object of this invention to provide a portable wax and wash apparatus particularly for use with automobiles wherein the apparatus is particularly characterized by its simplicity and economy of construction, manufacture, and operation.

It is yet another object of this invention to provide a portable wash and wax apparatus for cleaning and waxing an automobile wherein the automobile may efficiently, rapidly and conveniently be washed with clear water, washed with detergent, rinsed with clean water, and then waxed.

Further purposes and objects of this invention will appear as the specification proceeds.

Generally, my improved portable wash and wax apparatus includes an enclosure, a liquid wax container and a cleaning liquid container within the enclosure. An inlet on the enclosure connects to a source of pressurized water. A conduit interconnects the inlet with an outlet also mounted on the enclosure. Conduits interconnected the cleaning liquid container and the liquid wax container between the inlet and the outlet. Venturi means are provided for drawing cleaning liquid or liquid wax from the container as pressurized water passes through the venturi means. Valve means selectively permit passage of pressurized water only through the outlet, pass mixed cleaning liquid and water through the outlet, or pass mixed liquid wax and water through the outlet.

Brief description of the drawings

Referring to the accompanying drawings, there is shown one embodiment of the present invention, wherein:

FIGURE 1 is a side elevational view of my improved portable wash and wax apparatus for use with automobiles;

FIGURE 2 is a top plan view of the wash and wax apparatus shown in FIGURE 1;

FIGURE 3 is a cross-sectional view through a single valve preferably used in place of the three valves shown in FIGURES 1 and 2;

FIGURE 4 is a cross-sectional view taken along the line 4—4 of FIGURE 3 showing further details of the internal construction of the valve of FIGURE 3;

FIGURE 5 is a sectional view taken along the line 5—5 of FIGURE 4 showing the venturi and the communication of the venturi either to the liquid wax container or to the cleaning liquid container; and FIGURE 6 is a sectional view of the valve taken along the line 6—6 of FIGURE 3.

Detailed description of the invention

Referring to FIGURES 1 and 2, my improved wash and wax assembly, generally 10, includes an outer enclosure, generally 12, which is generally box-like in construction. The enclosure 12 includes a bottom 14, front wall 16, a rear wall 18, and a pair of opposed side walls 20 interconnecting the front and rear walls 16 and 18. The enclosure 12 is open at the top and has a cover 22 mounted thereon. Preferably the cover 22 is connected to the enclosure 12 by a hinge 24 mounted to the cover 22 and to the upper portion of one of the side walls 20. The top wall 26 of the cover 22 includes a handle 28 suitable for carrying the assembly 10. A suitable latch or lock, generally 30, is connected to the cover 22 and the side wall 20 at the end of the cover 22, opposite to the hinge 24, so that the cover 22 is normally maintained in the closed and locked position.

A suitable cylindrical container 32 for liquid wax is mounted within the enclosure 12 and rests on the bottom 14 in close proximity to one of the side walls 20. Similar container 34 having a liquid cleaning substance therein is contained within the enclosure 12 and also rests upon the container bottom 14 adjacent the other of the opposed side walls 20. The containers 32 and 34 are of cylindrical construction having hemispherical tops and include caps or covers 36 at the upper ends thereof. The liquid wax which is contained within the container 32 may be any of a variety of commercially available waxes. Preferably, the liquid or flowable wax is of the type which, when dried, forms a lustrous surface without the necessity of polishing or buffing. The liquid cleaning substance within the container 34 may also be any of a variety of commercially available cleaning liquids, such as detergents or the like. The containers 32 and 34 may either rest upon the bottom 14 of the enclosure 12 without any further support or suitable means (not shown) may be positioned in the container for positively securing the containers 32 and 34 in place within the enclosure 12.

Conduit or piping, generally 38, passes between and through the side walls 20 of the enclosure 12 at the lower rear portion of the enclosure 12. Suitable apertures are provided in the side walls 20 to permit passage of the conduit 38. The inlet 40 of the piping 38 includes a female hose fitting 42 for connection to the outlet end of an ordinary garden hose H. The opposite end of the conduit 38 has a male hose fitting 44 for connection to the inlet end of an ordinary garden hose H.

The central portion of the piping or conduit 38 includes a shut off valve 46. The valve 46 is preferably a quick opening plug valve which is opened and closed by a 90° rotation of the handle 48. In order to permit convenient manipulation by the operator, the handle 48 passes through an opening in the rear wall 18 of the lower rear portion of the enclosure 12.

A bypass pipe or conduit, generally 50, is connected to the conduit 38. The connection of the bypass conduit 50 to the main conduit 38 is made by a pair of T's 52 located on opposite sides of the shut off valve 46 and within the enclosure 12. The central portion of the bypass line 50 has a venturi 54 connected therein which acts to draw liquid wax or liquid cleaning fluid through the inlet 56 of the venturi 54 as water under pressure is passed from the inlet 40 to the outlet 44 through the bypass line 50 when the shut off valve 36 in the conduit 38 is in the closed position.

A pipe or conduit 58 passes from the venturi inlet 56 to an elbow fitting 60. A swing check valve 62 is positioned in the pipeline 58 so that liquid wax or liquid cleaner flows only in a direction from elbow 60 to the venturi inlet 56. The opposite side of the elbow 60 is connected to an upright pipe 61 which is connected to T 63.

One branch of the T connection 63 is interconnected to a conduit or pipeline 64 passing to the wax container 32 and the opposite branch of the T connection 63 is connected to a conduit or pipeline 66 passing to the detergent container 34. A valve 68 is interconnected in the wax pipeline 64 and another valve 70 is interconnected in the detergent pipeline 66. The valves 68 and 70 are preferably needle valves so that the operator may make a fine adjustment for the desired quantity of wax or detergent to be used in cleaning and waxing an automobile. Each of the needle valves 68 and 70 includes handles 72 which project outwardly through suitable apertures in the central portion of the front wall 16 of the enclosure 12 in order to permit the operator to easily manipulate the valves 68 and 70.

The inlet side of each of the needle valves 68 and 70 has flexible tubing or a hose 74 and 76 connected thereto. The tubes 74 and 76 are connected by a suitable tubing fitting (not shown) to the inlet side of each needle valve. The flexible hoses 74 and 76 pass downwardly through the caps 36 of the containers 32 and 34 and terminate a short distance above the bottom of each of the containers so that substantially all of the wax or detergent within each of the containers can be drawn therefrom by the siphoning action of the venturi 54.

A more clear understanding of the invention will be made by a detailed description of the operation of the unit 10. When a person desires to clean and wax his automobile, he may readily transport the apparatus 10 to a place adjacent his automobile and then connect the inlet hose fitting 42 to the outlet end of garden hose H connected to a source of water pressure. The outlet hose fitting 44 is connected to another hose H which has an outlet which may be directed against an automobile.

The needle valves 68 and 70 are then closed and the shut off valve 46 in the conduit 38 is turned 90° to the open position. Clear pressurized water then passes from the inlet 40 of the conduit 38 through the valve 46 and then through the outlet 44 to the garden hose H so that pressurized water may be directed against the automobile. This effects a prewash of the automobile and readies the car for subsequent washing with detergent and waxing.

When the prewash is completed, the shut off valve 46 in the conduit 38 is turned 90° to the closed or vertical position. The detergent needle valve 70 is then opened approximately ⅛ or ¼ of a turn. By closing the shut off valve 46, pressurized water is directed through the bypass conduit 50 and through the venturi 54. The pressurized water rushing through the venturi 54 creates a vacuum and draws or siphons detergent upwardly from the container 34 through the venturi inlet 56. The detergent becomes intermixed in desired proportions with the pressurized water. The detergent and water mixture then passes through the rest of the bypass 50, to the conduit 38, and finally through the outlet 44 and hose H so the detergent and water mixture is directed against the automobile for washing or cleaning the car.

When the automobile has been washed with the pressurized water and detergent to the desired extent, the detergent needle valve is turned to the closed position and the shut off valve 46 is once again placed in the open position. Thus, clear water once again passes through the conduit 38 to the outlet hose H so that clear water is directed against the automobile to rinse the detergent and dirt from the surface of the automobile.

After the automobile has been again rinsed to the desired extent with the clear water, the shut off valve 46 is closed again. The operator then opens the wax needle valve 68 to the desired extent, such as about ⅛ or ¼ of a turn. The water rushing through the venturi 54 draws the liquid wax from the wax container 32 and intermixes the wax with the water in the venturi 54. The water and wax mixture then passes to the conduit 38 and through the outlet hose H so the wax and water mixture is applied to the surface of the automobile. Since the liquid wax is preferably the type which requires no buffing, it is merely necessary for the operator to permit the water to dry so as to leave the film of wax which provides a high luster without buffing. Desirably, after the wax has been applied to the automobile, the wax needle valve 68 is closed and clear water only is again directed through the venturi 54 so as to clean it. This assures effective and efficient operation of the equipment in the future.

Referring to FIGURES 3–6, there is shown a preferred form of a single valve, generally 80, useful in the apparatus 10; this single valve 80 combines the shut off valve 48 and the needle valves 72 of the embodiment of FIGURES 1 and 2 into a single structure. However, the valve embodiment 80 requires the use of two venturis rather than a single venturi, as used in the embodiment of FIGURES 1 and 2.

An inlet 82 on the valve body 81 is sealably connected to the water conduit 38, as by pipe threads, which connects to the hose fitting 42 on the inlet side of the apparatus 10 and through which pressurized water passes. The inlet 82 communicates with lateral channel or aperture 84 which intersects a central upright opening or channel 86 in the valve body 81. Referring particularly to FIGURE 4, the central upright opening 86 has a valve spool 88 rotatably mounted therein. The spool 88 has an enlarged lower end of head 90 which abuts against the lower surface of the valve body 80. The upper end of the spool 88 has a reduced portion 92 which securely receives an outwardly projecting handle 94. The operator may, therefore, rotate the spool 88 to a desired position by movement of the handle 94. Desirably, the handle 94 contains indicia (not shown) which indicates to the operator which of three selected positions the valve is in.

The cylindrical spool 88 includes a cylindrical coaxial channel 96 in its central portion. The lower end of the channel 96 is pressure sealed by a plug 98. As shown in FIGURES 3 and 4, lateral conduits 100, at right angles to each other, provide communication between the channel 96 and the inlet 82 of the valve body 81. Pressurized water may thus be introduced to the central channel 96 through the conduit 100 from the inlet 82. Three such conduits 100 are provided to provide communication between the inlet 82 and the central channel 96 for all three selected positions of the valve 80.

The upper end of the central channel 96, as most clearly shown in FIGURE 6, intersects with a lateral channel 102 in the spool 88. The channel 102 is movable into alignment with a water conduit 104, a wax conduit 106, or a cleaning liquid conduit 108, each of which is provided in the valve body 81 at right angles to each other. When the channel 102 is in alignment with one of the channels 104, 106, or 108, one of the channels 100 is in communication with the inlet 82.

The water outlet conduit 104 is in direct alignment with the valve outlet 110 on the valve body 81 through an enlarged cavity 112. The valve outlet 110 is, like the valve inlet 82, connected in the conduit 38.

When the channel 102 in the spool 88 is aligned with the wax outlet conduit 106, the wax outlet 106 being aligned with and communicating with a channel 114 which receives a first venturi 116, pressurized water is directed through the first venturi 116 so as to draw liquid wax upwardly from the container to the wax line 76 and into the wax inlet 118, as best shown in FIGURE 5. The wax thus mixes with the water at the venturi 116 and the mixed water and wax passes through the venturi 116 and to a connection line 120 which intersects the enlarged cavity 112 to pass mixed water and wax outwardly.

In a similar way, when the channel 102 in a spool 38 is aligned with the cleaning liquid outlet 108, the outlet conduit 108 communicates with a right-angled channel 122 which has a second venturi 116 positioned therein. Again, the venturi 116 causes cleaning liquid to be drawn upwardly through the cleaning liquid line 74 through a channel (not shown) similar to that shown in FIGURE 5 for the wax conduit. After the cleaning liquid and water are mixed at the venturi 116, the mixture passes outwardly through the conduit 126 which intersects the central outlet cavity 112.

The valve body 80 is conveniently constructed by drilling a series of apertures which are sealably filled by plugs 128 placed in the ends of each of the drilled conduits. In order to provide a pressure seal between the spool 88 and the central aperture in the valve body 81, a series of three spaced O-rings 130 are received in the outer periphery of the spool 88.

The preferred valve construction of FIGURES 3-6, thus provides the operator with a single valve to control the operation of the apparatus 10 rather than three separate valves, as shown in the embodiment of FIGURES 1 and 2. Also, two venturis 116 are required in the embodiment of FIGURES 3-6, while only one is required in the embodiment of FIGURES 1 and 2. In the present embodiment the operator may selectively permit the passage of water only through the outlet, may permit the passage of mixed water and wax only through the outlet, or may permit the passage of mixed water and cleaning liquid only through the outlet, depending upon the relative rotated position of the valve spool 88. Simply by rotating the valve spool 88 through 90° the operator effects the same results as in the manipulation of the three valves shown in the embodiments of FIGURES 1 and 2.

It is seen from the foregoing description that a highly simple and effective apparatus useful for cleaning and waxing automobiles is provided. The unit is portable and may be manipulated so as to provide cleaning and waxing of an automobile to a highly desirable extent. Only two external connections are required to garden hoses and only one or three hand operated valves are required. All valves are accessible from the exterior of the apparatus and the hose connections are also accessible from the exterior. Furthermore, when the cleaning substance or the wax is removed from the containers 32 and 34, it is a simple matter for the operator to replace the old containers with new containers. The lock is released and cover 22 is pivoted open and the hose lines 74 and 76 are removed from the interior of the old containers. The old containers are lifted out of the enclosure and new containers are then placed within the enclosure 12. The hoses 74 and 76 are passed downwardly through the caps 36 to a position close to the bottom of each of the containers.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. A portable wash and wax apparatus for use with an external source of pressurized water particularly for use with automobiles, said apparatus comprising, in combination:
   a container for cleaning liquid,
   a container for liquid wax,
   means having an inlet for said external source of pressurized water,
   an outlet on said means communicating with said inlet,
   means for connecting said liquid wax container between said inlet and said outlet,
   means for connecting said cleaning liquid container between said inlet and said outlet,
   a first venturi for drawing cleaning liquid from said cleaning liquid container,
   a second venturi for drawing liquid wax from said liquid wax container,
   and valve means for selectively passing pressurized water directly from said inlet to said outlet, passing pressurized water through said first venturi to mix cleaning liquid and pressurized water before passing through said outlet, and passing pressurized water through said second venturi to mix liquid wax and water before passing the mixture through said outlet.

2. The apparatus of claim 1 wherein the means having said inlet and said outlet includes said valve means and said venturi means.

3. A portable wash and wax apparatus for use with an external source of pressurized water particularly for use with automobiles, said apparatus comprising, in combination:
   a container for cleaning liquid,
   a container for liquid wax,
   means having an inlet for said external source of pressurized water,
   an outlet on said means communicating with said inlet,
   means for connecting said liquid wax container between said inlet and said outlet,
   means for connecting said cleaning liquid container between said inlet and said outlet,
   valve means for selectively passing only pressurized water through said outlet, passing mixed water and cleaning liquid through said outlet, or passing mixed water and liquid wax through said outlet, said valve means comprising, a first valve connected to the means having said inlet and said outlet,
   a bypass conduit bypassing said first valve, and
   a venturi in said bypass conduit between said inlet and said outlet for selectively drawing liquid wax and cleaning liquid from said containers as pressurized water passes through said venturi.

4. A wash and wax apparatus for use with an external source of pressurized water particularly for use with automobiles, said apparatus comprising, in combination:
- a container for cleaning liquid,
- a container for liquid wax,
- means having an inlet for said external source of pressurized water,
- an outlet on said means communicating with said inlet,
- means for connecting said liquid wax container between said inlet and said outlet,
- means for connecting said cleaning liquid container between said inlet and said outlet,
- venturi means connected between said inlet and said outlet for drawing liquid wax and cleaning liquid from said containers as pressurized water passes through said venturi means, and
- valve means cooperating with said venturi means for selectively passing only pressurized water through said outlet in substantially unobstructed flow in bypassing relationship to said venturi means or passing pressurized water through said venturi means for discharging a mixture of water and said cleaning liquid or a mixture of water and said liquid wax through said outlet.

5. The apparatus of claim 4 wherein a second conduit means interconnects said venturi and the liquid wax in said wax container, third conduit means interconnects said venturi to the cleaning liquid in said cleaning liquid container, and said valve means includes a second valve connected in said second conduit means, and a third valve connected in said third conduit means so that as said second and third valves are closed and said first valve is open, water passes from said inlet means to said outlet means through said conduit means, and as said first valve is closed, either said second or third valve is opened for selectively causing pressurized water passing through said venturi to draw either liquid wax or cleaning liquid into said bypass conduit.

6. The apparatus of claim 5 wherein a fourth conduit interconnects said bypass conduit and said second and third conduit means and a check valve permits flow of either liquid cleaning substance or liquid wax in one direction only through said venturi.

7. The apparatus of claim 6 wherein an enclosure is provided for said containers, said first valve, said second valve, and said third valve each includes handles which extend outwardly through said enclosure for manipulation on the exterior of said enclosure, and said inlet and said outlet communicate with the exterior of said enclosure, and said conduits are all enclosed within said enclosure.

References Cited
UNITED STATES PATENTS

| | | | |
|---|---|---|---|
| 3,103,312 | 9/1963 | Damrow | 222—132 X |
| 3,118,610 | 1/1964 | Techler | 222—144.5 X |

SAMUEL F. COLEMAN, Primary Examiner

U.S. Cl. X.R.

222—144